United States Patent [19]

Kaartinen

[11] 3,830,628

[45] Aug. 20, 1974

[54] SAMPLE PREPARATION METHOD AND APPARATUS

[75] Inventor: Niilo H. Kaartinen, Turku, Finland

[73] Assignee: Packard Instrument Company, Inc., Downers Grove, Ill.

[22] Filed: Apr. 10, 1972

[21] Appl. No.: 242,481

[52] U.S. Cl. .......................... 23/230 PC, 23/253 PC
[51] Int. Cl. .......................................... G01n 31/12
[58] Field of Search .................. 23/230 PC, 253 PC

[56]  References Cited
UNITED STATES PATENTS

2,809,100   10/1957   Krasl .......................... 23/230 PC X
3,485,565   12/1969   Kaartinen ................. 23/253 PC UX Primary Examiner—Robert M. Reese
Attorney, Agent, or Firm—Wolfe, Hubbard, Leydig, Voit & Osann, Ltd.

[57]  ABSTRACT

Method and apparatus for the processing of fluid materials, particularly for the preparation of samples for radioactive isotope tracer studies by combustion of starting materials containing such isotope tracers. A starting material is burned in a combustion chamber. The combustion products are continuously exhausted from the combustion chamber and passed sequentially through a heat exchanger, one or more first exchange columns, a reaction column (if there is a radioactive isotope tracer remaining in gas form), and a second exchange column. Oxygen is fed into the combustion chamber at a controlled rate during combustion, and after combustion inert gas and injected water are fed into the combustion chamber and exhausted therefrom through the entire apparatus, so as to purge it of any remaining gaseous combustion products. The heat exchanger condenses most of the condensable vapors in the combustion products from the combustion chamber, and these condensed vapors (along with vapor from the injected water) are separated from the gases and collected in a first counting vial. The gases containing the remaining condensable vapors which pass into the first exchange columns are mixed therein and exchanged with a liquid. A first liquid scintillator is introduced to the first exchange columns and the direction of gas flow is then reversed therein to thereby discharge the residual liquid and scintillator liquid into the first counting vial. The uncondensed gases from the first exchange columns (containing the radioactive isotope tracer) which pass into the reaction column are reacted with a trapping agent therein, the reaction column comprising a series of smoothly contoured reaction chambers interconnected by smoothly contoured necked down portions. Untrapped gases discharged from the reaction column are passed through the second exchange column, comprising a series of bulbous chambers of small diameter relative to the reaction column, where they are scrubbed of any residual reaction products. A second liquid scintillator is introduced to the second exchange column and the direction of gas flow is then reversed therein, and in the reaction column, to thereby discharge the reaction products and scintillator liquid into a second counting vial. The apparatus is then cleaned by (a) passing inert gas along with additional injected water into the combustion chamber in a direction concurrent with the previous flow therein of combustion products, thence through the heat exchanger and into a waste receiver, (b) passing inert gas along with added water through the first exchange columns in a direction countercurrent to the previous flow therein of combustion products, and thence into the waste receiver, and (c) passing inert gas through the second exchange column in a direction countercurrent to the previous flow therein of combustion products, and thence through the reaction column and to waste.

32 Claims, 10 Drawing Figures

SAMPLE PREPARATION METHOD AND APPARATUS

DESCRIPTION OF THE INVENTION

The present invention relates generally to the preparation of fluid samples to be subjected to later tests or determinations. More particularly, the invention relates to methods and apparatus for the preparation of fluid samples for radioactive isotope tracer studies.

Various techniques have been devised for the preparation of samples for radioactive isotope tracer studies. A particularly efficient and commercially attractive technique for such sample preparation involves combustion of a starting material containing one or more isotope tracers, recovery and liquefaction of the gaseous combustion products containing the isotopes, and isolation of the individual isotopes to permit their quantitative determination.

Combustion techniques of this general type (combustion-recovery-isolation) have been disclosed in my United States Letters Patent Nos. 3,485,565 and 3,542,121, and in my copending applications Ser. No. 728,939, filed May 14, 1968, now abandoned in favor of my continuation application Ser. No. 277,261, filed Aug. 2, 1972; Ser. No. 58,635 filed July 27, 1970; and, Ser. No. 820,269, filed Apr. 29, 1969, now United States Letters Patent No. 3,682,598, as well as in their foreign counterparts. These techniques have involved manual placement by an operator or technician of an isotope tracer containing material into the apparatus for combustion, followed by various manipulations necessary for starting, controlling and terminating flows of the gases and liquids used in preparing the samples.

My previously disclosed techniques have advantageously reduced the sample preparation times, and have thus resulted in an increase in the number of samples that may be prepared per unit of time. My previously disclosed techniques have also brought about an increase in the efficiency of isotope recovery from the starting material, and accordingly have reduced the "memory" of the apparatus so that each sample preparation has become substantially independent of any previous preparation carried out in the same apparatus.

It is a primary object of the present invention to provide an improved method and apparatus for the preparation of samples for radioactive isotope tracer studies, which significantly further reduce the sample preparation time below that required using my aforementioned previously disclosed techniques, with a corresponding sharp increase in the sample preparation rate. Through use of the present invention it is possible to prepare a much greater number of samples per unit time than before, thereby improving the efficiency and reducing the cost of the preparation procedure.

Another important object of the present invention is to provide an improved sample preparation method and apparatus which significantly further increase the efficiency of the isotope recovery from the starting material over that attainable using my aforementioned previously disclosed techniques. More particularly, it is a specific object of this invention to provide such a method and apparatus which are capable of recovering essentially all of each tracer isotope present in the starting material.

A further significant object of this invention is to provide an improved sample preparation method and apparatus which reduces the "memory" of the apparatus by as much as an order of magnitude below that of previously known sample preparation techniques. Thus, a related object of the invention is to provide such an improved method and apparatus which even further improve the reliability of the resultant samples and the data derived therefrom.

Still another object of the invention is to provide such an improved sample preparation method and apparatus in which each sample is prepared automatically, the only manual steps required by the operator or technician being initial placement of the starting tracer containing material in the apparatus followed by starting a pre-programmed control unit to initiate the sample preparation operations.

Yet another object of the invention is to provide a method and apparatus for improved gas-liquid interaction to achieve a high reaction rate between gas and liquid, and yet one in which the apparatus may be thoroughly cleaned in a matter of seconds between successive batch-type reactions so that the apparatus has virtually no memory when used to react radioactive materials.

Another important object of the present invention is to provide an improved radioactive sample preparation apparatus which eliminates explosion and leakage hazards inherent in prior techniques.

Other objects and advantages of the invention will become apparent from the following detailed description and upon reference to the accompanying drawings, in which:

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
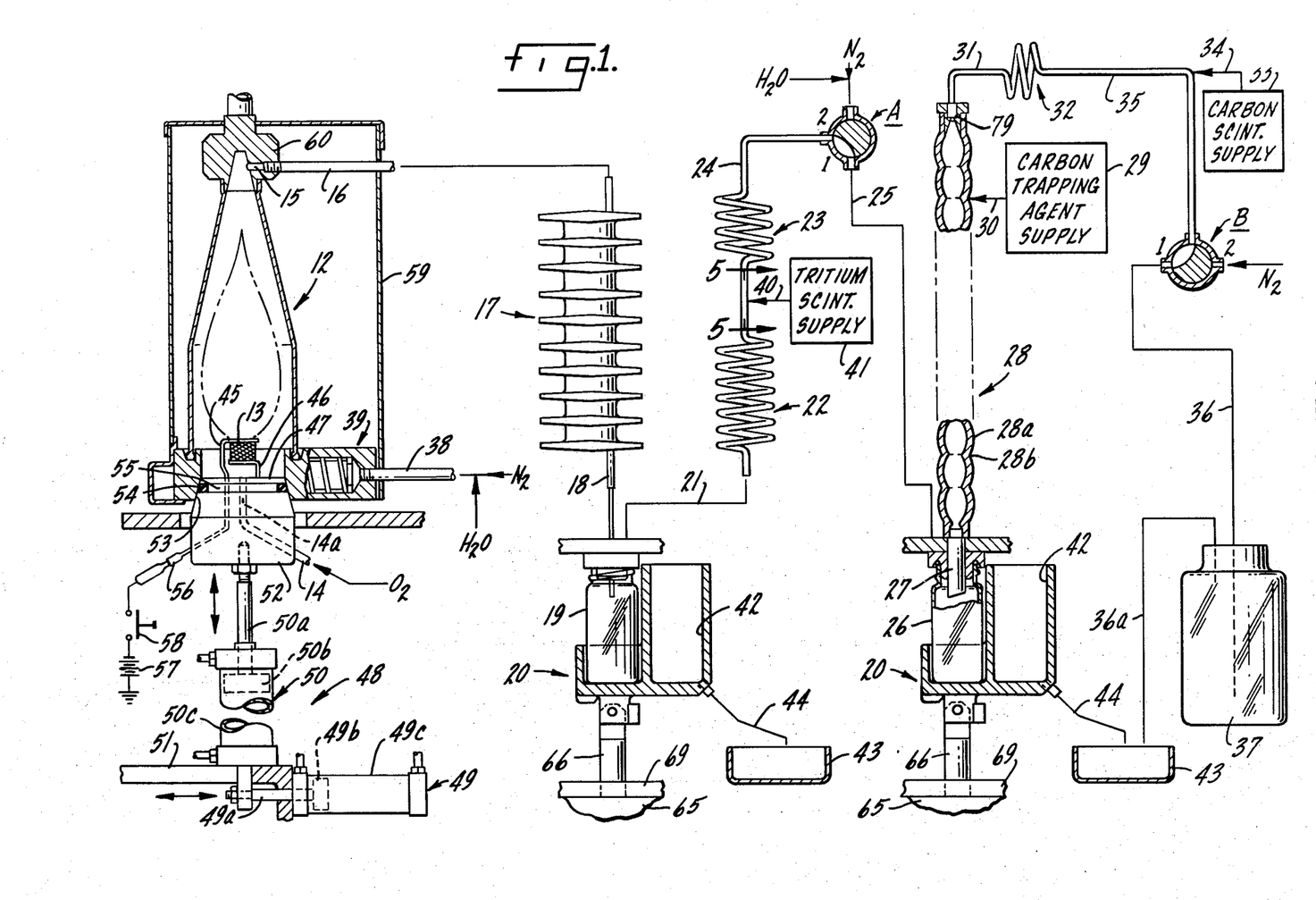
FIG. 1 is a schematic diagram of a sample preparation system embodying the present invention, for use in the preparation of samples for radioactive isotope tracer studies.

Turning now to the drawings, in FIG. 1 there is illustrated a sample preparation system for use in the preparation of samples for radioactive isotope tracer studies, such as studies involving tissue distribution and residue levels of drugs in plants and animals. In the preparation of such samples, the starting material containing the radioactive isotope tracer, such as plant or animal tissue, is burned to convert the carbon in the starting material to carbon dioxide and the hydrogen to water, and the radioactive isotope tracer is then recovered from the resulting combustion products. For example, if the particular radioactive isotope tracer employed is $^{14}C$, it appears in the combustion products as $^{14}CO_2$ gas; if the tracer is tritium ($^3H$), it appears in the combustion products as $^3H_2O$ in the form of a condensable vapor. Although $^{14}C$ and $^3H$ are the most commonly employed tracers, it will be understood that a number of other radioactive isotopes may be employed, such as $^{35}S$ which is converted to sulfate during combustion.

In order to provide samples which can be analyzed for radioactivity, the compounds containing the isotope tracers are recovered from the combustion products, and separated from any materials therein which might interfere with the radioactivity determination. For example, the $^3H_2O$ is recovered by cooling the combustion products to condense the vapors therein, including the $^3H_2O$, after which the condensed vapors are separated from the remaining gases. The $^{14}CO_2$ may also be recovered by condensation or freezing at extremely low temperatures, such as by the use of liquid nitrogen for example, but it is more conventional to react the $^{14}CO_2$ with a liquid trapping agent such as a particular amine compound; the resulting reaction product is then recovered and mixed with a liquid scintillator to provide a sample suitable for use in making a radioactivity determination.

GENERAL DESCRIPTION OF PROCESS

Referring now to FIG. 1, the apparatus illustrated there includes a combustion chamber 12 followed by various units, interconnecting conduits, and associated apparatus for treating the gaseous combustion products to separate and effect recovery of each radioactive isotope tracer. The apparatus in this instance is particularly adapted for recovery of $^3H$ and $^{14}C$ isotope tracers.

The overall operation may be described generally as follows. Material containing the radioactive isotope tracers is placed (in a manner described below) in an ignition basket 13 within the combustion chamber 12. The apparatus operator thereupon pushes a start button for a pre-programmed pneumatic control unit (not shown), and combustion oxygen is admitted to the chamber 12 through an oxygen inlet 14. The isotope containing material is quickly ignited, and the resulting gaseous combustion products pass upwardly through the combustion chamber 12 and then through an exhaust port 15. The combustion gases continue through a conduit 16 and into a heat exchanger 17, which in this case is a vertically oriented, air-cooled condenser. Water, including tritiated water, condensed from the combustion gases then passes through a heat exchanger outlet conduit 18 and collects in a tritium sample collection vial 19 located (in raised, sealed vial position — see FIG. 1) beneath the outlet 18. The vial 19 is held in place by a sample receiving mechanism 20.

The uncondensed gases exiting from the heat exchanger 17 pass into and out of the headspace of the vial 19, and then continue through a transfer conduit 21 and into a primary tritium exchange column 22. Exchange takes place in the column 22 between the tritiated water in the combustion gases and residual distilled water held in the column from the end of the previous cycle of the apparatus. The effluent gases from the primary exchange column 22 continue on and enter a secondary tritium exchange column 23 by means of an interconnecting conduit 24. Further exchange takes place in the secondary exchange column 23 between any relatively tritium rich gases leaving the primary column 22 and any entrained relatively tritium poor aqueous liquids carried into the secondary column 23 from the primary column 22. The resulting exchanged tritiated water remains for the most part in the exchange columns 22, 23 until the later flushing and cleaning steps (see below). At that time the tritiated water is flushed downwardly (by tritium scintillator solution) through the primary tritium exchange column 22, through the conduit 21 and into the tritium collecting vial 19.

The uncondensed gases emerging from the secondary tritium exchange column 23 then enter a transfer conduit 24 leading to a three-way valve A, which is in position 1 as shown in FIG. 1. The gases then continue through a conduit 25 and into a carbon sample collecting vial 26 disposed beneath the outlet 27 of a carbon reaction column 28. The column 28 contains a suitable carbon dioxide trapping agent, usually an amine compound, furnished from a trapping agent supply 29 by way of a feed conduit 30.

As the gases enter the bottom of the reaction column 28, the carbon dioxide vapors move upwardly through the column and meet liquid trapping agent flowing downwardly. Heat is generated from the reaction between the carbon dioxide and the amine (some trapping agent becomes vaporized), and the intimate physical and chemical contact between gas and liquid results in fractional reaction taking place between the carbon dioxide and the trapping agent.

Any unreacted gases emerging from the reaction column 28 (tend to be saturated with amine vapor) then pass through a conduit 31 and into a carbon exchange column 32. From the end of the previous apparatus cycle the carbon exchange column 32 contains residual carbon scintillator solution supplied from a scintillator supply 33 by means of a conduit 34. In the carbon exchange column 32 further fractional reaction and mixing takes place between any gaseous carbon dioxide present, the residual scintillator solution, and the trapping agent vapors.

The exit gases from the carbon exchange column 32, now thoroughly scrubbed of virtually all residual carbon dioxide but saturated with scintillator vapor, pass on through a conduit 35 and into a three-way valve B. The valve B is set at position 1 so that the gases continue through a conduit 36 and into a vented waste container 37. The waste container 37 preferably contains a suitable liquid such as methanol through which the discharge gases from conduit 36 are bubbled to scrub out any final residual carbon trapping agent or scintillator present, and the gases discharged to atmosphere (through a line 36a) are basically odor free.

Upon completion of combustion of the starting material, oxygen supply to the combustion chamber 12 is terminated. Distilled water is then injected into the base of the combustion chamber through an inlet conduit 38 leading to a steam generator 39 disposed within the combustion chamber, and approximately simultaneously an inert gas, such as nitrogen, is also admitted through the conduit 38 into the base of the combustion chamber. The water flashes to steam in the generator 39, and the inert gas and water vapor sweep the products of combustion upwardly through the combustion chamber, through the transfer conduit 16 and heat exchanger 17, and thence into the tritium sample collecting vial 19 where the condensed liquids are collected. Uncondensed gases leave the headspace of the vial 19 and continue on into the conduit 21 and through the rest of the apparatus.

Now the valves A and B are shifted (preferably simultaneously) from position 1 to position 2 (see FIG. 1). This results in isolation of the carbon from their from the tritium side of the apparatus (via valve A), and opens both sides to access (through the valves A and B) to inert gas (and water at valve A). At the same time, the tritium sample receiving vial 19 and the carbon sample receiving vial 26 are partially lowered (see dotted position in FIG. 7), so that they are open to atmosphere, and feed of tritium and carbon liquid scintillator solutions to the apparatus is initiated.

The tritium scintillator solution is introduced between the primary 22 and secondary 23 tritium exchange columns via an inlet conduit 40 from a tritium scintillator supply 41. Carbon scintillator solution enters the conduit 35 via the transfer conduit 34 from the carbon scintillator supply 33.

Passage of the tritium scintillator solution downwardly through the primary tritium exchange column 22 causes the exchanged liquid water within the column to be washed down through the conduit 21 and into the partially lowered tritium sample collection vial 19. On the carbon side, the carbon scintillator solution passes sequentially through the carbon exchange column 32, the connecting conduit 31 and the carbon reaction column 28, with the resulting wash liquids flowing through the outlet 27 and into the partially lowered carbon sample collection vial 26.

Shortly after the start of tritium and carbon scintillator solution flow to the apparatus, a second inert gas sweep takes place. This time inert gas (preferably nitrogen gas) is admitted as before into the combustion chamber 12 via conduit 38, and is also admitted through each of the three-way valves A and B.

The inert gas sweep through the combustion chamber forces residual gases and liquids therein through the conduit 16, thence through the heat exchanger 17 and into the tritium sample collection vial 19. Purged liquids are retained in the vial 19; the gases are vented to atmosphere through the open vial mouth. Sweep gas admitted through valve A forces residual gases (but not liquids, except for any tritium scintillator solution which might have been introduced into the primary tritium exchange column 22 in excess of its holding capacity) within the upper conduit 24 and the tritium exchange columns 23, 22 into the tritium sample collection vial 19. And the inert sweep gas entering the apparatus through valve B pushes gases within the conduit 35, carbon exchange column 32, conduit 31, and carbon reaction column 28 (as well as any liquids therein) downwardly and into the carbon sample collection vial 26. Once more, purged liquids are retained in the vial 26 and gases are vented to atmosphere through the open vial mouth.

A short time after commencement of the second inert gas flush, a mist cleaning cycle begins. As described in detail below, this cleaning operation involves increasing all three of the inert gas flows (i.e. — into the combustion chamber 12, and through valves A and B) to enhance the sweep forces available within the apparatus, and admission of distilled water to the combustion chamber 12 and through valve A (along with the inert gases being fed at those locations). The sample receiving mechanism 20 is actuated to further lower and then tilt the tritium and carbon sample collection vials 19, 26 (see FIG. 8) so that their vialmouths are no longer accessible to fluids flowing downwardly through the outlets 18, 21 (tritium) and 27 (carbon). In the tilted position of the sample receiving mechanism 20, fluids flowing from the outlets 18, 21 and 27 a9v diverted into a waste receiving compartment 42 in the mechanism 20.

The turbulent gas-liquid cleaning conditions thus created throughout the apparatus have been found to cleanse the apparatus of virtually all residual radioactivity in an extremely highly efficient manner. The wash liquids which flow into the waste receiving compartment 42 of the mechanism 20 are then directed to a waste reservoir 43 via a conduit 44 and disposed of. The waste wash gases pass harmlessly into the atmosphere from the open compartment 42.

Following completion of the cleaning cycle, the two water and three inert gas feeds to the apparatus described above in connection with the cleaning cycle are terminated, the ignition basket 13 is withdrawn from the combustion chamber 12 (see description below) in readiness for the next sample preparation, and the pneumatic control unit (not shown) shuts off. Now the tritium sample collection vial 19 and carbon sample collection vial 26 may be removed from the sample receiving mechanism 20 by the apparatus operator, and the radioactivity of the tritium and carbon samples determined using a photomultiplier or other suitable radioactivity counting device.

COMBUSTION CHAMBER

While various combustion chamber designs may be used in practicing the invention, it is preferred to use a generally flame shaped combustion chamber or flask of the type disclosed in my U.S. Pat. No. 3,485,565, or in my pending U.S. application Ser. No. 820,269, filed Apr. 29, 1969 now U.S. Pat. No. 3,682,598.

The combustion chamber 12 illustrated in FIG. 1 is of this general type. The radioactive isotope containing starting material to be burned is placed in an ignition basket 13 which forms a part of the electrical ignition system, and may also function as a catalyst for efficient combustion of the starting material. To this end the basket 13 is made of nichrome or like electrically resistive material (or platinum or a platinum-rhodium alloy where the catalytic effect is desired), so that it functions as an electrical resistor in the ignition system. A pair of electrical conductors 44 and 46 extend upwardly from a mounting plate 47 to support the basket 13 at its upper and lower ends, while also making electrical contact with the basket to connect it into the electrical ignition system. The conductors 45 and 46 extend vertically down through the plate 47 and terminate in depending connector pins beneath it.

In order to facilitate the loading of successive specimens for combustion, the mounting plate 47 is supported on a retracting and elevating mechanism 48 which automatically moves the ignition basket 13 and mounting plate 47 from an open position easily accessible to the operator (not shown in the drawings) to a closed or sealed position within the combustion chamber (as shown in FIG. 1). The retracting and elevating mechanism 48 includes two pneumatic piston and cylinder arrangements 49 and 50 mounted in a housing 51. One piston and cylinder arrangement 49 effects lateral movement of the ignition basket 13 from an extended position beneath and in front of the combustion chamber 12 (where the basket 13 is readily accessible to the operator) to a retracted position directly beneath the other such chamber (neither position shown in the drawings), and the other arrangement 50 effects vertical movement of the ignition basket 13 up and into the bottom of the combustion chamber.

As will be seen, a platform 52 for the mounting plate 47 may be threaded or otherwise secured onto the end of a pneumatic piston rod 50a carried by a vertically disposed piston 50b housed within a cylinder 50c. At the end of each apparatus cycle, the pneumatic cylinder and piston assembly 50 may be actuated to retract the piston rod 50a downwardly from the position shown in FIG. 1, thereby lowering the basket 13 through an opening 53 in the bottom of the combustion chamber 12. After reaching a lowered position, the basket 13 may be extended outwardly away from the combustion chamber 12 (and into a location readily accessible to the operator) upon actuation of a piston rod 49a carried by a horizontally disposed piston 49b housed within a cylinder 49c.

To load a specimen for ignition in the basket 13, the operator places the specimen in the outwardly extended basket and then pushes the start button on the control unit (not shown). Thereupon, the piston and cylinder assembly 49 is actuated to advance the rod 49a laterally and thereby move the basket to a position directly beneath the combustion chamber 12. Next, the piston and cylinder assembly 50 is actuated to extend the piston rod 50a and thereby raise the basket 13 through the opening 53 and into the combustion chamber 12. As the platform 52 enters the opening 53, a sealing ring 54 mounted in a groove 55 in the outer periphery of the platform engages the tapered walls of the opening 53 to form a gas-tight seal therewith, as shown in FIG. 1.

For the purpose of igniting a specimen contained in the basket 13, the connector pins depending from the plate 47 are received by a complementary electrical receptacle 56 in the platform 52. The receptacle 56, in turn, is connected to an electrical igniter circuit including a power source such as battery 57 and an ignition switch 58 for applying an electrical voltage across the basket 13, which serves as a resistive type heating element in the igniter system. Thus, the radioactive specimen is ignited by simply closing the switch 58, which is opened again as soon as combustion has been completed.

For combustion of the specimen contained in the basket 13, pure oxygen is supplied to the combustion chamber 12 through the conduit 14 and a cooperating passageway 14a formed in the platform 52 and the plate 47. The gas discharge passageway 14a in the plate 47 is positioned directly beneath the center of the basket 13, so that the oxygen is fed directly into the combustion zone. The oxygen flow rate is initially adjusted, by suitable valving and flow metering means (not shown), to a level slightly above that required to support combustion of the sample, so that there is a slight excess of oxygen within the combustion chamber 12. This excess oxygen rises through the combustion chamber 12 and is exhausted from the combustion chamber along with the combustion products through the lateral exit 15 at the top of the chamber. A pressurized oxygen supply container (not shown), which functions much like a capacitor, is preferably employed, so that as the demand for oxygen in the combustion chamber 12 diminishes during combustion of the specimen, the oxygen feed to the combustion chamber diminishes accordingly.

The combustion chamber 12 is preferably open at its upper end, with its sidewalls extending upwardly and inwardly above the specimen basket 13 so as to approximate the shape of the flame of a burning sample. This arrangement advantageously minimizes the volume of oxygen-rich atmosphere around the flame, and the walls of the combustion chamber 12 are preheated so as to maintain the wall temperature above the condensation temperature of the vapors contained in the combustion products. With this design, the combustion products tend to be swept directly into the exit 15, with the rising layer of oxygen-rich atmosphere along the chamber sidewalls tending to isolate the combustion products from the sidewalls. Moreover, any combustion products that do contact the chamber walls remain in the gaseous state, even during initiation of the combustion, because the walls are pre-heated and maintained at a temperature above the condensation temperature.

Thus, in the illustrative embodiment of the combustion chamber 12 illustrated in FIG. 1, the walls of the combustion chamber extend vertically upwardly past the ignition basket 13, and then slope inwardly above the basket so as to approximate the shape of the flame represented in broken lines. Surrounding the combustion chamber 12 is a rectangular enclosure 59 which defines an air filled cavity around the outer surface of the chamber 12. For proper location of the combustion chamber 12 within the enclosure 59, the upper end of the chamber meshes with a complementary mounting element 60.

Prior to ignition of the specimen contained in the basket 13, the air in the cavity between the combustion chamber 12 and the enclosure 59 may be heated by means of a heating coil (not shown) located inside the steam generator 39. The air distributes this heat along the walls of the combustion chamber 12 so that the walls are uniformly heated to a temperature above the condensation temperature of the vapors contained in the combustion products to be produced. It has been found that the pre-heating of the combustion chamber walls to maintain the combustion products in gaseous form even during ignition, combined with the flame-shaped configuration of the chamber, permits the combustion products to be exhausted from the combustion chamber, on a continuous basis, so efficiently that there is virtually no residue of combustion products deposited on the chamber walls. The illustrative system also prevents condensation within the exit 15 of the combustion chamber 12, since the exit is also surrounded by the pre-heated air in the cavity between the combustion chamber and the surrounding enclosure 59.

As disclosed in my pending U.S. application Ser. No. 820,269, filed Apr. 29, 1969, now U.S. Pat. No. 3,682,598, provision is preferably made for introducing into the system one or more gasiform oxides of a non-radioactive nuclide which is an isotope of a radioactive nuclide present in the primary specimen. Thus, where the specimen contains carbon-14 and tritium, either carbon dioxide or water, or both, may be introduced into the system. As the term is used herein, "water" refers to either liquid or gas-form water, although it will be appreciated that at the temperature prevailing within the enclosure 59, typically 200°C., the water exists as water vapor, or steam.

Referring to FIG. 1, water is introduced via the steam generator 39 located near the bottom of the combustion chamber 12. Details of construction of an illustrative form of the steam generator 39 have been disclosed in detail in my aforesaid patent application and for this reason need not be repeated here. Suffice it to say that liquid water is drawn from a pressurized water storage container or flask (not shown) and discharged into a heater (also not shown) in which the water is vaporized and from which the vapor is directed into the combustion chamber 12.

For certain purposes, particularly when the specimen to be burned is small in size and it is desired to assay for carbon-14, non-radioactive carbon dioxide may be introduced into the combustion chamber 12 through a counterpart of the water introduction system described above. As described in my aforementioned patent application, carbon dioxide gas under a pressure higher than that within the combustion chamber 12 is discharged into the combustion chamber. Whichever of water or carbon dioxide is introduced, it is advantageously added immediately following combustion so that the non-radioactive gases mix well with the products of combustion.

In the remaining discussion herein it will be appreciated that the injected water and/or carbon dioxide mixes with the combustion products and is carried through the recovery system. Accordingly, no distinction is hereafter made between the oxides of radioactive and of non-radioactive nuclides.

As explained fully in my aforementioned application Ser. No. 820,269, filed Apr. 29, 1969, now U.S. Pat. No. 3,682,598, a particularly useful advantage of that invention is to improve separations of different radionuclides when preparing liquid samples from a multiple labeled starting specimen, for example one containing both carbon-14 and tritium. As has been explained, the recovery system is designed to collect water in the vial 19 and carbon dioxide (as carbamate) in the vial 26. Inevitably, however, some carbon dioxide may be absorbed in the water-collecting vial 19 and, conversely, some water may collect in the $CO_2$—collecting vial 26. Where the amounts of labeled water and $CO_2$ from the starting specimen are small, losses of water and $CO_2$ (even though in very small quantities) by collection in the incorrect vial may be quite significant. However, when water is injected in accordance with this invention, the absolute amount of water and tritiated water lost to the incorrect vial is constant, but as there is now more water, the relative amount of all water, and particularly tagged water, collected in the water-collecting vial is increased. Otherwise stated, a higher proportion of the tagged water is collected in the proper water-collecting vial 19. The net effect therefore is to improve the resolution of the tagged gases so that, for practical purposes, counting the sample in the water-collecting vial 19 counts essentially all the tritium in the starting specimen.

Separations in the case of double labeled starting specimens are even further improved by augmenting the combustion products with both water and carbon dioxide. This has the effect of providing more of the water and tritiated water and more of the $CO_2$ and carbon-14 dioxide to the recovery system, so that the collection of either tagged nuclide in its appropriate collection vial represents an even greater proportion of the original amount of that tagged nuclide.

HEAT EXCHANGER

As the combustion gases leave the combustion chamber exit 15, they enter a transfer conduit 16 which is insulated to maintain the fluids passing therethrough in a gaseous state. In the particular embodiment illustrated, the transfer conduit 16 is double-walled with a metallic inner shell and an insulating outer shell to minimize heat loss therethrough. From the transfer conduit 16, the gaseous combustion products are passed into the heat exchanger 17 for cooling the exhausted combustion products to condense the vapors therein.

The heat exchanger 17 may be constructed as generally described in my U.S. Pat. No. 3,542,121. The illustrative heat exchanger 17 shown in detail in FIGS. 2-4 herein is of this general type. It comprises a helically coiled tube 62 (FIG. 4) forming a fluid passageway for receiving the combustion products from the conduit 16, and the lower or outlet end 18 of which terminates adjacent the tritium sample collection vial 19 carried by the sample receiving mechanism 20. The heat exchanger 17 as shown is air-cooled, and is provided with a plurality of fins 63 for facilitating heat transfer from the inner fluids to the outer surrounding atmosphere.

Figures 2, 3, 4, 5, 6:
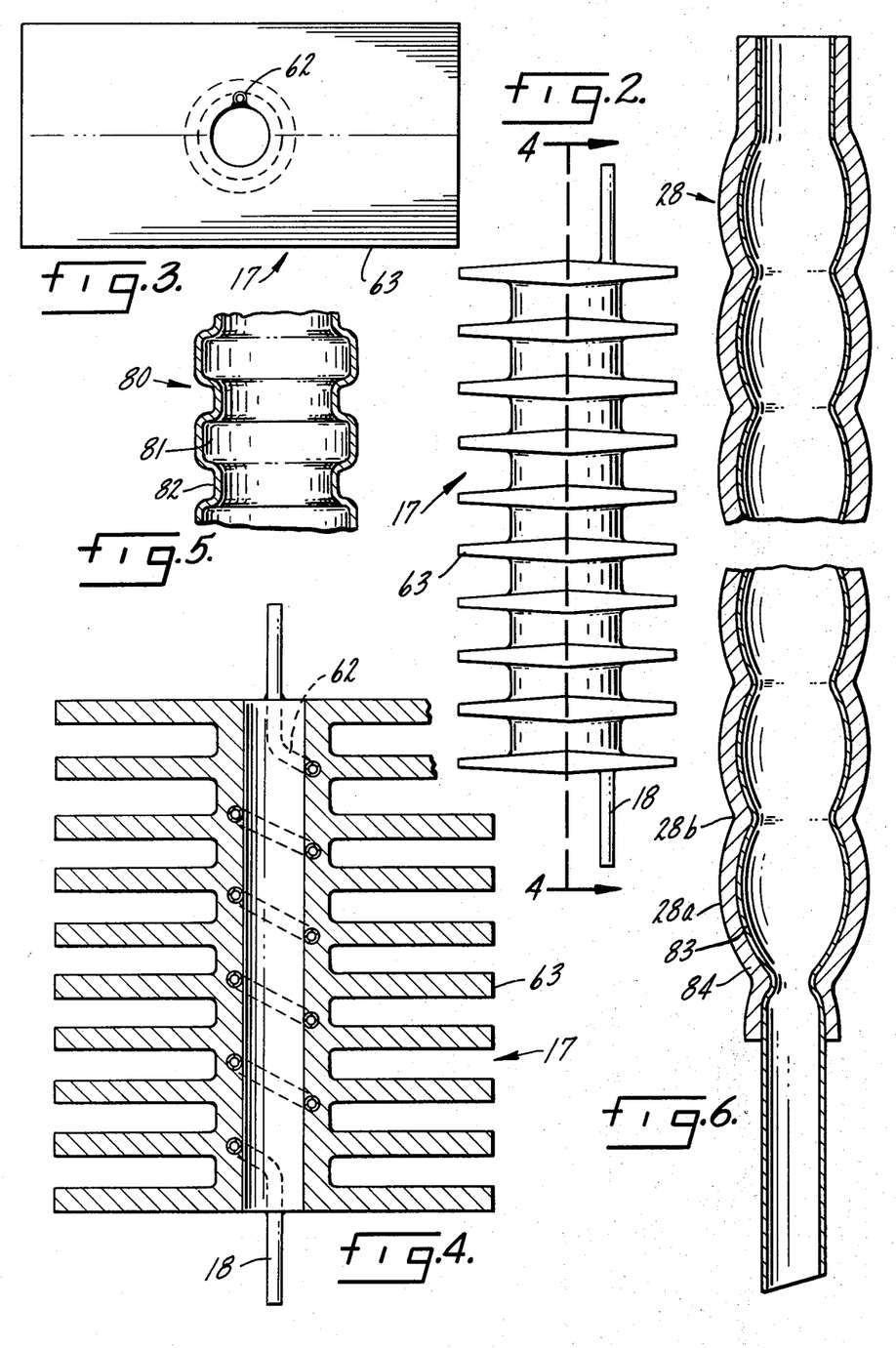
FIG. 2 is an elevational view of an illustrative heat exchanger which may be used in carrying out the invention.
FIG. 3 is an enlarged plan view of the illustrative heat exchanger shown in FIG. 2.
FIG. 4 is a vertical sectional view of the illustrative heat exchanger taken along the line 4—4 in FIG. 2.
FIG. 5 is a fragmentary cross-section of the illustrative exchange columns shown in FIG. 1 for secondary recovery of both tritium and radioactive carbon.
FIG. 6 is an enlarged, fragmentary cross-sectional view of the illustrative carbon reaction column shown in FIG. 1.

When the radioactive isotope tracer to be recovered is in the form of a condensable vapor, such as $^3H_2O$ for example, the heat exchanger 17 functions to convert the tracer from vapor to liquid form. In cases where the radioactive isotope tracer is in the form of a gas to be reacted with a trapping agent, such as $^{14}CO_2$ for example, the heat exchanger 17 functions to remove the condensable vapors from the tracer gas before it is reacted with the trapping agent.

The fluid passageway 62 of the heat exchanger 17 is formed of thermally conductive material designed to provide laminar flow of gases and vapors passing therethrough in the absence of condensation, and the cross section of the fluid passageway is sufficiently small in at least one direction transverse to the fluid flow to provide capillary attraction on the type of liquid condensed within the passageway. For example, the tubing 62 may be made of thin walled metal, preferably stainless steel, having an inside diameter of about 0.085 inch and an outside diameter of about 0.109 inch, and a length when coiled of about 7 inches. The mean diameter of the coil may be about 9/16 inch. The coiled tubing 62 may be cast in an aluminum cylinder, the cylinder then being machined to provide the cooling fins 63. As shown the heat exchanger 17 includes ten cooling fins spaced evenly along its length, approximately two inches wide by four inches long, and tapering from 3/16 to 3/32 inches in thickness.

Although both the volume and the heat transfer surface area of the coiled tubing 62 are obviously very small, it has been found that this heat exchanger 17 is capable of reducing the temperature of the combustion gases to the condensation temperature with such a high degree of efficiency that most of the condensable vapors are recovered in liquid form at its outlet end 18 (a minor proportion of these vapors continues on into the tritium exchange columns). Moreover, this heat transfer is effected without producing a high back pressure or otherwise inhibiting the exhaustion of the combustion products from the combustion chamber 12 directly upstream of the heat exchanger inlet.

Although it is not intended to limit this aspect of the apparatus operation to any particular theory, it is believed that the fluid passageway causes droplets of liquid condensate to form along the walls of the passageway, thereby providing extremely efficient heat transfer conditions, and that this drop-wise condensation may be caused or promoted by the capillary nature of the fluid passageway.

SAMPLE RECEIVING MECHANISM

As mentioned earlier, a single mechanism 20 is provided for receiving both of the prepared samples, i.e. in this case both of the tritium and carbon containing samples. For clarity of understanding, the single sample receiving mechanism 20 is shown twice in FIG. 1, once associated with recovery of the tritium sample (left side of FIG. 1), and again associated with recovery of the carbon sample (right side of FIG. 1). It will be understood, as described below and as more fully illustrated in FIGS. 7-10, that the single mechanism 20 holds both of the sample vials, i.e. vial 19 for tritium and vial 26 for carbon, in side-by-side relationship.

Although the details and advantages of the illustrative sample receiving mechanism 20 are fully described in application Ser. No. 242,443 of Roy E. Smith filed Apr. 10, 1972, a brief general description is given below. As illustrated in the drawings, the sample receiving mechanism 20 includes a tiltable tray 64 for holding the sample receiving vials 19 and 26, a pneumatic piston and cylinder assembly 65 having the piston (not shown) arranged for vertical movement, and a link 66 integral with the piston and connected to the tray by means of a clevis 67 and pin 68 arrangement for transmitting movement of the piston to the tray. The sample receiving mechanism 20 is mounted on a fixed lower support plate 69, to the underside of which the piston and cylinder assembly 65 is suitably attached.

The mechanism 20 is arranged within the sample preparation apparatus such that the sample vials 19 and 26 are normally aligned with and located directly beneath the outlets 18 and 27 of the heat exchanger and carbon reaction column, respectively. Portions of the support structure for the heat exchanger 17 and carbon reaction column 28 are designated generally in the drawings as 70.

As shown, the tray 64 is provided with front 71 and rear 42 compartments. The front compartment 71 is sized and shaped to hold both sample vials 19 and 26 in spaced apart, side-by-side relationship. The rear compartment 42, rectangular in cross-section, is adapted to receive various waste fluids from the apparatus (produced during cleaning) and transmit them through the conduit 44 into the waste reservoir 43.

Figures 7, 9, 10:
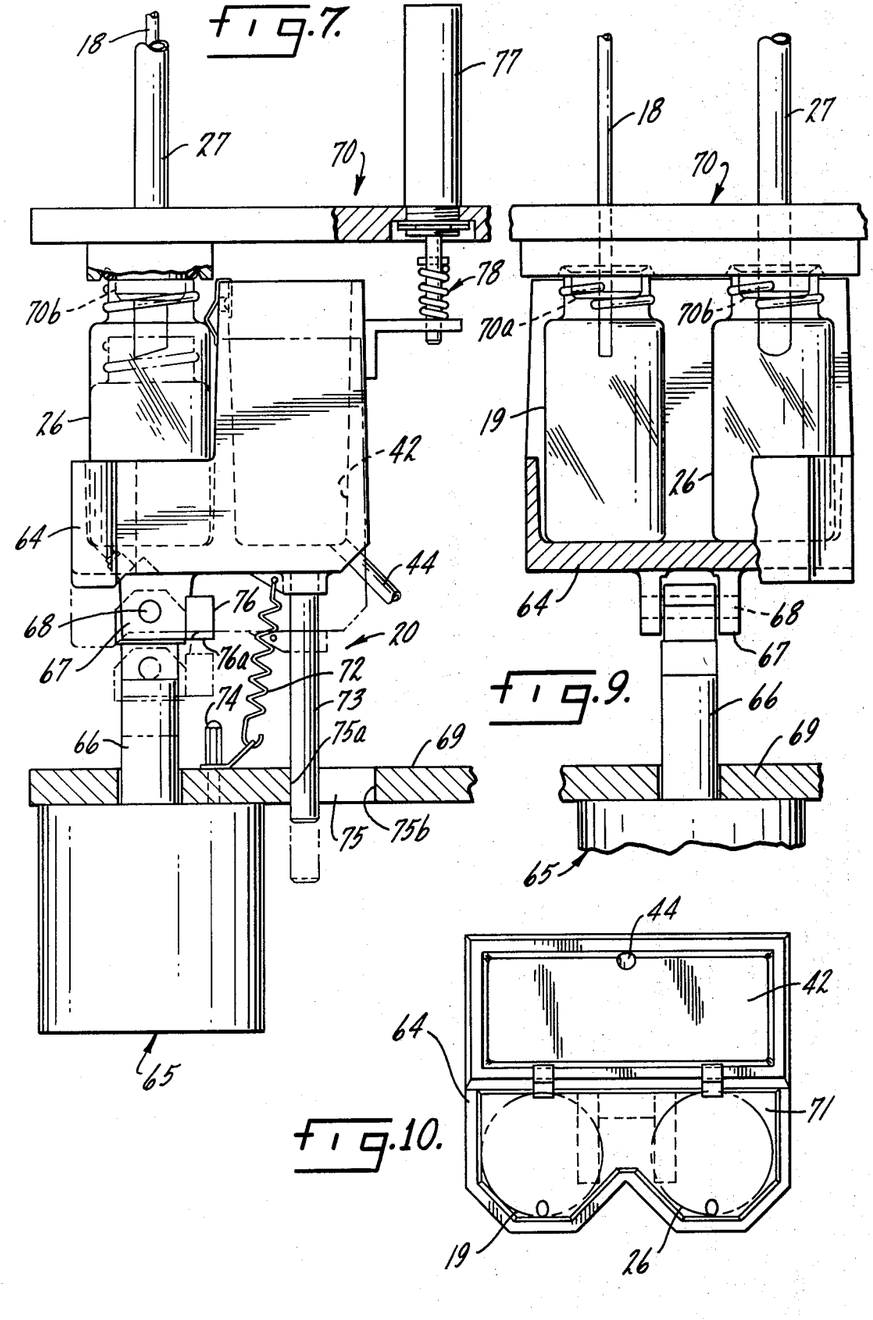
FIG. 7 is a side elevational view of an illustrative sample receiving mechanism, showing the sample vials in sealed (solid lines) and unsealed positions (dotted lines)
FIG. 9 is a fragmentary front elevational view of the illustrative sample receiving mechanism shown in FIGS. 7 and 8.
FIG. 10 is a top plan view of the sample receiving mechanism shown in FIGS. 7–9.
Figure 8:
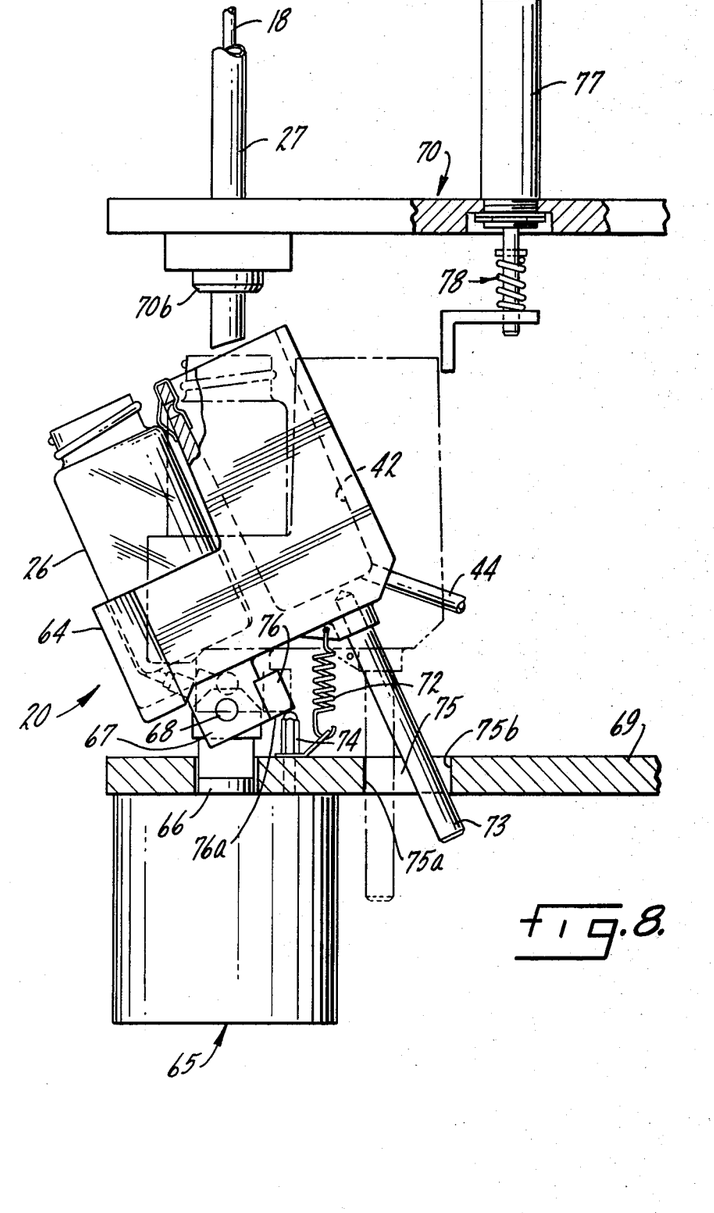
FIG. 8 is a side elevational view of the illustrative sample receiving mechanism similar to FIG. 7 but showing the mechanism in a tilted condition for receiving waste liquids.

The sample receiving mechanism 20 is constructed to support the tiltable tray 64 at one of three operating positions. These are (a) a sealed vial position, i.e. with the vials 19 and 26 sealed tightly against the support structure 70 and thus against the outlets 18 and 27 of the heat exchanger and carbon reaction column, respectively, (b) a partially lowered position, i.e. with the vials 19 and 26 disengaged from the support 70 but still aligned directly beneath the outlets 18 and 27, respectively, and thereby open to the atmosphere while still being positioned to collect liquids from these outlets, and (c) a tilted position in which the vials 19 and 26 are tilted away from the outlets 18 and 27, and instead the waste receiving compartment 42 is arranged beneath these outlets so that fluids from the heat exchanger and carbon reaction column are directed to waste.

In the illustrative apparatus, the support structure 70 includes resilient connectors 70a and 70b (including vial bushings and O-ring gaskets) provided at the lower ends of the heat exchanger 17 and carbon reaction column 28, respectively, for connecting the outlets 18 and 27 to the sample vials 19 and 26. When the tray 64 is in the sealed vial position, the combustion products discharged from the lower outlet 18 of the heat exchanger 17 flow downwardly into the sample vial 19 with the liquids being retained in the vial by gravity and the gases continuing on into the conduit 21 through a suitable discharge passageway (not shown) formed in the resilient connector 70a. Likewise, a suitable passageway (also not shown) is provided in the connector 70b for admitting fluids to the carbon sample vial 26 from the transfer conduit 25, with gases continuing on into the carbon reaction column 28.

The tray 64 is held in the sealed vial position when the piston and link 66 are in their extreme upward position (i.e. upward piston motion having been transmitted to the tray through the clevis 67 and pin 68 arrangement). Inasmuch as the clevis 67 and pin 68 connection between the link 66 and tray 64 is offset with respect to the vertical centerline of the tray, it is necessary to provide means for maintaining the horizontal stability of the tray when it is in the sealed vial and partially lowered positions. To this end, i.e. to assure horizontal stability of the tray 64 and to assure proper vertical alignment of the vials 19 and 26 beneath the outlets 18 and 27, a coil spring 72 and guide pin 73 are interposed between the bottom of the tray and the lower support plate 69. The coil spring 72 is secured at its upper end to the underside of the tray 64, and at its lower end to the support plate 69 by means of a capscrew 74. As described below, the capscrew 74 is provided with an elongated head which serves as a stop for effecting tilting of the tray 64. The guide pin 73, also fixed at its upper end to the underside of the tray 64, extends downwardly through an opening 75 (having sides 75a and 75b) provided in the support plate 69.

When the tray 64 is disposed in an upright position, the guide pin 73 is urged by the spring 72 against the side 75a of the opening. Thus, when the tray 64 is in either the sealed vial position or the partially lowered position, the bias of the spring 72 urging the guide pin 73 against the side 75a of the opening in the support plate 69 provides assurance that the vials 19 and 26 remain properly aligned with their respective vial bushings to prevent skewing of the vials. The guide pin 73 also lends assurance that the tray will remain in a non-tilted condition with the vials 19 and 26 vertically aligned with and located beneath the outlets 18 and 27.

The tray 64 may be readily dropped from the sealed vial position to the partially lowered position by retraction of the piston and link 66 a predetermined distance (partially lowered position shown in phantom in FIG. 7). For tilting the tray 64 from its partially lowered (but upright) position to an inclined position, stop means in the form of the top of the capscrew 74 (see FIG. 8) is provided for engagement by the undersurface 76a of a member 76 located on the underside of the tray. As will be seen, the vertical line of contact between the member 76 and the capscrew 74 is laterally offset from the line of force running through the link 66 and pivot 68. Thus, upon downward retraction of the piston and link 66, the horizontally disposed tray 64 moves downwardly until the surface 76a engages the top of the capscrew 74. Further downward travel of the piston and associated link 66 (see FIG. 8) results in pivoting or tilting of the tray 64 about the clevis pin 68 by reason of cam action between the surface 76a and the capscrew 74.

Downward movement of the piston and link 66 is continued until the angle of tilt (about 30° from the horizontal as illustrated in FIG. 8) is such that the mouths of the sample receiving vials 19 and 26 are removed from beneath the outlets 18 and 27 (and from access by fluids emerging therefrom) and are replaced by the waste receiving compartment 42 of the tray. The desired angle of tilt may be achieved by limiting downward travel of the piston (in a conventional manner), and by sizing the plate opening 74 and guide pin 73 such that the lower portion of the pin contacts the side 75b of the opening and thereby acts as a stop to prevent overtilt.

Restoration of the tray 64 to the horizontal is accomplished by moving the piston and link 66 upwardly a sufficient distance to disengage the surface 76a from the capscrew 74, whereupon the spring 72 and guide pin 73 arrangement take over to swing the tray back into the horizontal position.

For assuring that scintillator solution will be injected into the apparatus only when the sample vials are in their partially lowered position, a scintillator feed control valve 77 is mounted on the support structure 70, and a sensing mechanism 78 connected with the valve and extending below the support 70 is provided for contacting the sample vial when in the raised position (and thereby disabling the valve until the vial is lowered). This arrangement (vials lowered) also advantageously prevents any volatile vapors from being returned back to the combustion chamber and creating a potential explosion hazard.

TRITIUM AND CARBON EXCHANGE COLUMNS

For the purpose of affording highly intimate gas-liquid interactions in those portions of the apparatus located just downstream of the heat exchanger 17 and the carbon reaction column 28, specially constructed exchange columns are provided. These include the primary and secondary tritium exchange columns 22, 23, and the carbon exchange column 32.

As illustrated and described herein all three of the exchange columns 22, 23 and 32 are constructed alike, although their sizes necessarily may differ to accommodate the different flow rates and varying gas-liquid interaction conditions encountered in spaced locations throughout the apparatus. Referring to FIG. 1, and particularly to the detail shown in FIG. 5, it will be seen that the illustrative exchange columns are preferably formed of coiled metal tubing 80 machined to provide it with a plurality of specially shaped bulbous chambers 81 closely spaced together along the length of the tubing. The chambers 81 are defined by uniformly spaced constrictions 82 formed in the tubing in such a manner that the cross-sectional tubing shape presented to the flow of fluids therein repeatedly varies from a narrow, restrictive opening at each constriction 82 to a wide, expansive opening at each bulb 81. It has been found that this special internal configuration of the exchange columns advantageously permits selective adjustment of the flow of gases therethrough so that free gas flow occurs without at the same time causing all the liquid adhering to the internal tubing walls to be forced out of the tubing. The tubing 80 thus functions highly efficiently in bringing about co-existence of liquids and gases within the tubing and intimate interaction therebetween.

One illustrative primary tritium exchange column 22 was constructed to the following specifications. The column 22 was formed of coiled, stainless steel tubing having an outer tubing diameter (i.e. outer diameter of bulbs 81) of one-eighth inch, and approximately 3.3. feet long (straight). The tubing was formed with approximately 990 bulbs 81, each having an inside bulb diameter of about 0.11 inches, and the inner diameter of the constrictions 82 between bulbs was approximately 0.09 inches. The water storage capacity of the resulting exchange column was approximately 0.4 milliliters at a gas flow through the column of 4 liters per minute.

An illustrative secondary tritium exchange column 23 was formed from coiled, stainless steel tubing having an outer tubing (and bulb) diameter of about 0.18 inches, and approximately 20 inches in length (straight). The tubing had about 200 bulbs 81, each of which had an inside bulb diameter of about 0.15 inches. The inner diameter of the constrictions 82 between bulbs was about 0.11 inches. The water storage capacity of the exchange column was about 0.55 milliliters of water at a gas flow through the column of 4 liters per minute.

A carbon exchange column 32 was formed of the same size and type tubing used for the secondary tritium exchange column, except that it was approximately 23 inches long (straight) and contained about 230 bulbs. Its storage capacity of carbon scintillator solution was about 1.15 milliliters at 4 liters per minute gas flow through the column.

As mentioned, the exchange columns illustrated and described herein have made it possible to achieve extremely high exchange and interaction efficiencies between liquids and gases passed therethrough. For example, in carrying out a double labeled sample preparation the illustrative tritium exchange column 22 may be used in the illustrative control cycle described below. When so used, the column 22 may be initially partially filled with 0.2 to 0.4 milliliters of distilled water. When uncondensed gases from the heat exchanger 17 enter the column 22, it is found that exchange rapidly takes place between tritiated water in the combustion gases and the distilled water held in the column. Effluent gases pass out of the primary column 22 and into the secondary column 23, while exchanged tritiated water remains in the primary column 22 until the later flushing and cleaning steps. The effluent gases entering the secondary tritium exchange column 23 interact therein with partially condensed liquids and vapors, with the result that the gases exiting from the column 23 are virtually completely scrubbed of tritiated water.

Use of the illustrative carbon exchange column 32 described above in the illustrative control cycle described below brings about further intimate liquid-gas interaction on the carbon side of the apparatus. At the beginning of a double labeled sample preparation, the carbon exchange column 32 may be partially filled with approximately 0.5 milliliters of carbon scintillator solution, enough to form at least a liquid film on the internal walls of the column. Vapors (containing unreacted $CO_2$ and trapping agent liquid and vapor, and some carbamate) entering the column 32 from the carbon reaction column 28 become intimately mixed, reacted and interacted with each other and with the carbon scintillator solution in the column. The efficiency of interaction is assisted by provision of an orifice 79 (see FIG. 1) in the upper end of the reaction column 28, through which the vapors pass and expand (with resultant partial condensation from the cooling due to expansion). It has been found that this interaction is so efficient that virtually all of the $CO_2$ entering the carbon exchange column 32 becomes absorbed and reacted there, so that the gases emerging from the column 32 have been scrubbed clean.

A further advantageous feature of these specially constructed exchange columns 22, 23 and 32 is that they enable the apparatus to be thoroughly cleaned after sample preparation has been completed, so that no "memory" remains to contaminate subsequent samples.

The inert gas and liquid sweep from valve A and (in countercurrent direction) through the secondary 23 and primary 22 tritium exchange columns to thereby thoroughly clean them has been described previously. Over on the carbon side of the apparatus, the carbon exchange column 32 is where the mist cleaning cycle begins. Inert sweep gas enters valve B and passes in counter-flow direction into the carbon exchange column 32 along with carbon scintillator solution (from the supply 33). As a result, great turbulence is created in the carbon exchange column 32, so much so that a scintillator spray or fine mist may be and preferably is formed. This superactive mist then functions as the cleaning medium, washing the carbamate reaction product (of carbon dioxide and the amine trapping agent) as well as unreacted trapping agent counter-currently through the column 32, downwardly through the carbon reaction column 28, and into the carbon sample collection vial 26.

CARBON REACTION COLUMN

The illustrative carbon reaction column 28 is of the general type described in my copending application Ser. No. 58,635 filed July 27, 1970. In the exemplary form, the column 28 is adapted to recover $^{14}CO_2$ gas from the stream of combustion gases. In the illustrative apparatus, the uncondensed combustion gases from the combustion chamber 12 pass through the conduit 25 and into the carbon sample vial 26 (via the resilient connector 70b). From the sample vial 26, the gases enter the lower outlet end 27 of a column 28 comprising a series of smoothly contoured bulbous chambers 28a interconnected by smoothly contoured necked down portions 28b, with the interconnecting walls of the chambers 28a and the necked down portions 28b forming a smooth curvilinear configuration. Fractional interaction between the entering combustion gas stream and the recovery or trapping liquid previously admitted to the column is effected when the gas stream is passed through the series of enlarged bulbous chambers 28a and contacts the recovery liquid distributed along the length of the fluid passageway formed in the column. The liquid becomes effectively mixed with the gas stream, whereby fractional interaction between gas and liquid is effected along the length of the fluid passageway.

As shown in FIG. 6, the illustrative bulbous column 28 is preferably formed having a nickel metal interior 83 (for resistance to corrosion by hot trapping agent and its carbamate) and a lead metal exterior 84 (for its desirable heat storage capacity). The carbon trapping agent feed 30 may desirably be located above the middle of the column 28, for example between the second and third bulbous chambers from the top of the column.

One exemplary column 28, used in the illustrative control cycle described below, had the following approximate dimensions. The inner nickel thickness was about 0.01 inch, and the outer lead thickness was approximately 0.16 inch. The length of the column was about 20 inches and it included 29 bulbs (28a). Each bulb had an inside bulb diameter of about 0.46 inches. The inside diameter of the constrictions 28b was approximately 0.31 inches, and the column had a storage capacity of about 12–15 milliliters of amine trapping agent at a gas flow rate of 7 liters per minute.

When the liquid trapping agent is fed into the column 28 in the illustrative arrangement, there must be a sufficient gas flow through the column to retain the liquid within the column, i.e., to prevent the liquid from flowing downwardly through the outlet 27 and into the vial 26. In a typical sample preparation process, this initial gas flow may be provided by oxygen that is passed through the combustion chamber 12 just prior to ignition of the specimen.

When the combustion gases containing the $^{14}CO_2$ enter the column 28, the liquid trapping agent is uniformly distributed throughout the various bulbous chambers 28a, and such distribution is maintained as long as the combustion gases flow through the column. The distribution of the liquid trapping agent throughout the column 28 may be achieved by increasing the gas flow rate sufficiently to sweep the liquid upwardly through the column, and thereafter maintaining the gas flow rate, including the flow rate of the combustion gases, at a level sufficient to maintain the desired liquid distribution. That is, the upward gas flow through the column 28 distributes the liquid trapping agent along the walls of the bulbous or enlarged reaction chambers 28a while preventing the trapping agent from flowing down through the outlet 27 at the bottom of the reaction column, so that no liquid trapping agent enters the vial 26.

As the gases containing the radioactive isotope tracer, such as $^{14}CO_2$ for example, are passed upwardly through the reaction column, the radioactive compound is chemically reacted with the trapping agent, such as methoxy ethyl amine for example, fractionally along the length of the column 28 to form a carbamate reaction product which is held within the reaction chambers 28a along with the liquid trapping agent.

The reaction between carbon dioxide gas and the amine trapping agent is exothermic, so that the bottom of the reaction column 28, where the reaction is most intense, tends to become hot. This heat is dissipated from the metal column through the surrounding atmosphere, but the rate of heat dissipation is relatively low, by reason of use of lead as a construction material for the column. The column 28 thus has a relatively high heat capacity (for metal), so that much of the heat generated within the bottom of the column during the exothermic reaction is thereafter retained within the column. This retained heat serves to control the viscosity of the carbamate reaction product (which is quite viscous at room temperatures) so that it readily flows downwardly into the carbon sample collection vial 26.

The amount of reaction product contained in the series of reaction chambers 28a varies along the length of the reaction column, but it has been found that the reaction effected by this reaction column configuration traps virtually all of the isotope tracer. The unreacted gases are exhausted from the upper end of the reaction column 28 through the conduit 31 and to the carbon exchange column 32 as previously described.

THE LIQUID REACTANTS

Any of various well known scintillator solutions may be employed in practicing the invention. Such solutions conventionally contain phosphors in which scintillations occur in response to an ionizing event, e.g. upon impingement on the phosphors of alpha particles emitted from the radioactive isotope. Many toluene and dioxane based scintillator solutions have been used successfully for determination of $^3H$ and $^{14}C$. It is generally desirable for the tritium scintillator solutions used in practicing the invention to have high tritium counting efficiency and high compatibility with water (for example the solution may contain various emulsifiers).

Carbon scintillator solutions useful in practicing the invention should desirably have a high concentration of scintillator phosphors to compensate for the dilution and quenching effect of the $CO_2$ trapping agent. For example, the following carbon scintillator solution has been found to be effective:

| | |
|---|---|
| PPO (2, 5-diphenyl-1, 3-oxazole) | 15 grams |
| bis-MSB (p-bis-(o-methylstyryl)-benzene) | 1 gram |
| Toluene to make 1 liter. | |

For trapping the gaseous $CO_2$, various amines may be used, including ethanolamine. Particularly effective $CO_2$ absorbers which may be used are certain lower alkoxy alkyl amines, for example methoxy ethyl amine or ethoxy ethyl amine. Use of these amines is described in detail in application Ser. No. 242,243 of Viekko Tarkkanen, filed Apr. 7, 1972.

LIQUID METERING DEVICES

As described elsewhere herein, a typical sample preparation cycle involves feed to the apparatus of batch quantities of several liquids, i.e. tritium scintillator solution, carbon scintillator solution, and carbon trapping agent. It is advantageous in carrying out the invention for these liquid feeds to be metered so that exact measured quantities of each liquid may be introduced into the apparatus. These quantities may be selected for each liquid based upon the size and design of the apparatus itself, as well as upon the character and size of the initial specimen to be ignited and the nature and flow rates of the various liquids and gases within the apparatus.

Any suitable liquid metering device may be employed for each of the liquid feeds to the illustrative apparatus. Although not shown in the drawings herein, these liquid metering devices could be associated with the tritium scintillator supply 41, the carbon scintillator supply 33, and the carbon trapping agent supply 29. One such liquid metering device which has been found particularly useful in practice of this invention is a pneumatically operated, submerged suction type device described in application Ser. No. 242,669 of Robert C. Gullett, filed Apr. 10, 1972.

ILLUSTRATIVE CONTROL CYCLE

The following describes an illustrative manner of carrying out the invention embodied in this application. For purposes of illustration the starting material or specimen is of about 1.3 gms. size, it is double labeled with $^3H$ and $^{14}C$ radioactive isotope tracers, and the apparatus is sized and constructed in accordance with the description given above.

After placing suitable empty sample vials 19 and 26 (approximately 20 ml. capacity) in the sample receiving mechanism 20, the apparatus operator places the double labeled starting material in the ignition basket 13 of the combustion flask 12. The operator then presses the start button of a pre-programmed control unit. This control unit (not shown in the drawings) includes timing mechanisms responsive to predetermined time schedules. From this point forward all operations take place automatically. Approximately 40 seconds later (not including combustion time) the apparatus cycle has been completed. At that time separate samples containing the two isotopes have been prepared, the vials 19 and 26 containing these samples are ready for radioactivity determinations to be made, and the apparatus has been thoroughly cleaned and is ready for preparation of new samples from the next starting material.

The control unit start button is pressed at program time zero. (The following description is in terms of a typical timing program pre-selected for the control unit). At program time: one second, the ignition basket 13 containing the specimen to be ignited is retracted laterally in response to actuation of the retracting and elevating mechanism 48, and then is elevated until the basket 13 extends into and becomes sealed in the bottom of the combustion flask 12. At the same time the sample vials 19 and 26 are moved vertically upwardly by the sample receiving mechanism 20, so that each vial becomes sealed against its resilient connector 70a, 70b provided in the support 70 at the lower ends of the heat exchanger 17 and carbon reaction column 28.

Electrical voltage is applied to the heating element of the ignition basket 13 at approximately program time: two seconds, and at about program time: four seconds, gaseous oxygen feed is initiated to the combustion flask 12. Following the start of combustion (i.e. beginning at about program time: 5 seconds), the programmed control unit is preferably stopped, and later re-started by a timer (also not shown) after combustion of the starting material is complete (up to 3 minutes later). In this instance the source of the gaseous oxygen feed may be a suitable pressure vessel (not shown) charged with a measured quantity of oxygen maintained at about 35 psig. As indicated, oxygen feed to the combustion chamber 12 continues for up to 3 minutes, i.e. until the starting material has been fully burned.

At about program time: three seconds, both three-way valves A and B are shifted to position 1 (from position 2 at end of previous cycle), so that the passages within the entire sample preparation apparatus are open to permit movement of fluids from the combustion chamber 12 all the way through the apparatus and to the vent waste bottle 37.

Returning for a moment to the initial depression of the start button at program time: zero, the liquid metering device (not shown) for the amine trapping agent (for carbon dioxide) also begins to charge itself with liquid amine (e.g. methoxy ethyl amine) stored in the amine supply container 29. Charging continues for about four seconds, then the charging pressure is vented and the liquid amine is dispensed from the metering device into the upper portion of the carbon reaction column 28 via feed conduit 30. The quantity of amine admitted to the carbon reaction column 28 depends on the nature of the starting material and other apparatus and process variables. For example, 10–12 milliliters of amine may be injected into the carbon reaction column 28 over approximately 4 seconds time.

After passage of a pre-determined time set on the timer for completion of combustion (e.g. one to 3 minutes) the programmed control unit takes over again (at program time of about 5 seconds) and voltage is removed from the ignition basket 13. At the same time oxygen flow to the combustion chamber 12 is terminated, and the oxygen pressure vessel is recharged in readiness for the next sample preparation cycle.

At program time: 8 seconds (i.e. about 3 seconds after combustion completed), a measured portion (e.g. 0.4 milliliters) of water is injected into the combustion flask 12 (via conduit 38 and steam generator 39). Immediately thereafter the inert gas flush to sweep the products of combustion through the apparatus begins. Inert gas ($N_2$) is admitted into the bottom of the combustion chamber 12 through the line 38, and flows through the apparatus in the same combustion chamber as the products of combustion. The inert gas thus sweeps the products of combustion upwardly through the combustionchamber 12 and thence through the entire sealed system, with the inert gas ultimately finding its way to atmosphere at the vent-waste bottle 37. Typically this inert gas flush lasts about 3–4 seconds.

Meanwhile, at program time: 9 seconds, the liquid metering devices for the tritium scintillator and carbon scintillator solutions begin to charge themselves with liquid fromtheir respective scintillator liquid storage containers (not shown). Charging is usually complete at about program time: 13 seconds.

At approximately program time: 14 seconds, the three-way valves A and B are each shifted from position 1 to position 2 (thereby isolating the carbon from the tritium side of the apparatus), and the sample receiving vials 19 and 26 are partially lowered (dotted lines in FIG. 7) to break their seals and vent them to the atmosphere. At the same time the tritium and carbon scintillator metering devices are actuated and begin injecting the liquid scintillators into the apparatus. The tritium scintillator liquid, for example about 15 milliliters, is preferably introduced via conduit 40 between the primary 22 and secondary 23 tritium exchange columns. The carbon scintillator liquid (perhaps 10–12 milliliters) is fed into the carbon exchange column 28.

Next, a second inert gas flush takes place. This time, beginning at about program time: 18 seconds, inert gas ($N_2$) is admitted at three different locations: a.) through the conduit 38 into the bottom of the combustion flask 12, as before, plus b.) through the three-way valve A and into the conduit 24 leading to the secondary tritium exchange column 23, and c.) through the three-way valve B and into the conduit 35 leading to the carbonexchange column 32.

The inert gas admitted to the combustion flask 12 (e.g. at a rate of about 1.6 liters/minute) sweeps the residual oxygen and injected water upwardly through the flask, through the conduit 16 and downwardly through the heat exchanger 17. Liquid swept out of the bottom of the heat exchanger is carried into the partially lowered tritium sample collecting vial 19, while the oxygen and inert gases are vented to atmosphere at the vial mouth.

The inert sweep gas admitted through valve A (e.g. 3.0 liters/minute) passes downwardly (i.e. in a direction counter to the normal flow of combustion products) through the secondary tritium exchange column 23, thence through the primary tritium exchange column 22, through the conduit 21 and into the tritium sample collection vial 19. The swept liquid (any tritium scintillator solution in excess of the primary exchange column capacity) is retained in the vial 19, while the swept gases are vented to atmosphere at the open vial mouth.

On the carbon side of the apparatus, the inert sweep gas entering valve B (e.g. 2.4 liters/minute) passes in counter flow direction through the carbon exchange column 32, thence downwardly through the carbon reaction column 28 and into the partially lowered carbon sample collection vial 26. The swept liquids (any carbon scintillator solution in excess of the capacity of the carbon exchange column, plus residual liquid in the carbon reaction column) are collected in the vial 26, while the gases are vented to atmosphere at the vial mouth.

The above three flows of inert purging gas continue for about 4 seconds, and then (program time: 22 seconds) the mist cleaning cycle begins. At that time all three of the inert gas flows described above are increased to provide even greater sweep forces within the apparatus. For example, the inert gas flow through the combustion flask is increased to about 4.6 liters/minute and the flows through valves A and B are each increased to approximately 8.0 liters/minute. At the same time, additional distilled water (e.g. a total of about 5 milliliters) is admitted through the conduit 38 entering the combustion flask 12 (along with the inert gas entering there) as well as through valve A (along with the inert gas entering there). At this point, turbulent gas-liquid cleaning or flushing conditions are created throughout the apparatus.

Shortly after iniation of the cleaning cycle (e.g. at program time: 23 seconds), both sample collecting vials 19 and 26 are lowered completely, and the sample receiving tray 64 is tilted to the waste removal position (see FIG. 8). In this way all of the cleaning and cleaned fluids are directed into the waste compartment 42 of the tray 64, and thence into the waste reservoir 43, thereby avoiding dilution of the samples with materials that might interfere with the radioactivity determinations to be made later on them.

Thus the cleaning and cleaned fluids flow (a) upwardly through the combustion chamber 12, conduit 16, downwardly through the heat exchanger 17, and into the waste compartment 42, (b) through the tritium secondary 23 and primary 22 exchange columns and into the waste compartment 42, and (c) through the carbon exchange column 32, carbon reaction column 28 and into the waste compartment 42.

On the tritium side of the apparatus the cleaning and cleaned fluids comprise for the most part mixtures of gaseous $N_2$, water (distilled), and tritium scintillator solution. The cleaning and cleaned fluids on the carbon side of the apparatus are made up for the most part of gaseous $N_2$, carbon scintillator solution, and amine trapping agent.

At the end of the cleaning cycle (program time: 36 seconds) the water feeds to the combustion chamber 12 and to valve B are terminated. Then (e.g. at program time: 39 seconds), the additional gaseous $N_2$ feeds (all three that were started at program time: 22 seconds) are terminated, the balance of the gaseous $N_2$ feed is terminated, the ignition basket 13 is lowered from the combustion flask 12 and is moved forward in readiness for placement of the next material to be analyzed, and the control unit shuts off.

At the completion of the cycle (program time: 40 seconds), the $^3H$ and $^{14}C$ isotope samples contained in the vials 19 and 26 are ready for the operator to remove them and for determination of their radioactivity, the programmer is in its normally off position, and the fully cleaned apparatus is ready for preparation of the next samples.

It will be understood from the foregoing description that the illustrative sample preparation system may be used to prepare samples from starting materials labeled with only a single tracer to be recovered either as a condensed vapor or by reaction with a trapping agent, or from double-labeled samples containing tracers to be recovered by both means. In the event that the material is labeled with only a single tracer to be recovered as a condensed vapor, the gases discharged from the first sample vial 19 are simply passed on through the balance of the apparatus and vented to the atmosphere. In the case of a sample labeled with only a single tracer to be recovered by reaction with a trapping agent, it is not necessary to supply a liquid scintillator to the tritium exchange columns. Similarly, there is no need to feed any liquids whatever into the carbon reaction column 28 when the sample is labeled with only a single tracer to be recovered as a condensed vapor, since the gases discharged from the vial 19 will normally be vented to the atmosphere there. If it is desired to prepare only tritium labeled samples, for example, that portion of the apparatus downstream of the vial 19 may even be eliminated.

As will be seen from the foregoing detailed description, this invention provides an improved sample preparation method and apparatus which even further reduce the sample preparation time below the preparation time required by the methods and apparatus previously known, with corresponding increases in the sample preparation rate. Consequently, a technician using this system can prepare a much greater number of samples in any given work period, thereby improving the efficiency and reducing the cost of such preparation procedures.

This invention significantly increases the efficiency of the isotope recovery from the starting material, permitting recoveries of essentially all of each isotope present in the starting material. As a result, the memory of the sample preparation equipment is virtually eliminated, so that the reliability of the resultant samples and the data derived therefrom are greatly improved.

I claim as my invention:

1. Apparatus for preparing samples for use in radioactive isotope tracer studies, comprising a combustion chamber for burning a specimen of material containing a radioactive isotope tracer to produce combustion products containing the radioactive tracer in the form of condensable vapors, means for supplying oxygen to said combustion chamber at a controlled rate during the burning of the material, means for continuously exhausting the combustion products from said combustion chamber, heat exchanger means for receiving the exhausted combustion products and condensing a portion of the condensable vapors therein, means for receiving the combustion products from said heat exchanger and collecting said portion of condensed vapors, control means associated with said combustion chamber for terminating the oxygen supply and supplying an inert gas to said combustion chamber upon completion of the burning of said specimen so as to sweep any residual combustion products out of said chamber and on through said heat exchanger means and receiving and collecting means, means for treating the combustion products from said receiving and collecting means to condense substantially all of the remaining condensable vapors therefrom, and means for supplying a liquid to said treating means so that said liquid flows therethrough and into said receiving and collecting means thereby recovering any condensed vapors remaining in said treating means upon completion of each specimen combustion.

2. Apparatus as set forth in claim 1 in which the receiving and collecting means includes connection means for a sample vial to receive the condensed vapors, said vial connection means being adapted to permit the headspace of said vial to be vented to said treating means while receiving inert gas from said heat exchanger whereby said inert gas displaces any oxygen contained in the headspace.

3. Apparatus as set forth in claim 1 in which means is included for pre-heating the walls of said combustion chamber so as to maintain said walls above the condensation temperature of the vapors contained in the combustion products.

4. Apparatus as set forth in claim 1 in which means is provided for supplying liquid to said combustion chamber upon completion of burning of said specimen.

5. Apparatus as set forth in claim 1 in which means is provided for supplying an inert gas to said treating means in a direction of flow countercurrent to the flow therein of combustion products whereby residual fluids in said treating means are discharged to waste.

6. Apparatus as set forth in claim 1 in which said heat exchanger comprises a thermally conductive material forming an elongated, coiled fluid passageway designed to provide laminar flow of gases and vapors passing therethrough in the absence of condensation, the cross-section of said passageway being sufficiently small in at least one direction transverse to the fluid flow to provide capillary attraction on the liquid condensed in said passageway.

7. Apparatus as set forth in claim 6 in which the heat exchanger comprises a coiled tube made of a thermally conductive material and having an inside diameter of less than about 0.1 inch.

8. Apparatus as set forth in claim 1 in which said combustion chamber includes a basket for holding the specimen to be burned, and the side walls of said chamber extend upwardly and inwardly above said basket so as to approximate the shape of the flame of a burning specimen and thereby minimize the oxygen-rich atmosphere around the flame.

9. Apparatus as set forth in claim 8 in which means is included for moving said basket in and out of said combustion chamber for the loading of successive specimens therein.

10. Apparatus as set forth in claim 1 in which gas trapping means is provided comprising a reaction column including means for receiving a liquid trapping agent for the gas and means for receiving uncondensed gases from said bulbous column means and reacting said gases with said trapping agent as the gases flow through the column, means for reversing the direction of said gas flow through said column for discharging said trapping agent and the reaction product from said column, and a sample vial connected to said reaction column for receiving said trapping agent and said reaction product from said column in response to the reversal of said gas flow.

11. Apparatus as set forth in claim 10 in which the reaction column comprises a series of smoothly contoured reaction chambers, each adjacent pair of which are interconnected by a smoothly contoured necked down portion with the interconnecting walls of said chambers and said necked down portions forming a smooth curvilinear configuration.

12. Apparatus as set forth in claim 1 in which gas trapping means is provided comprising a reaction column including means for receiving a liquid trapping agent for the gas and means for receiving uncondensed gases from said bulbous column means and reacting said gases with said trapping agent as the gases flow through the column in a first direction, and means for reversing the direction of said gas flow through said column for discharging said trapping agent and the reaction product from said column, a sample vial connected to said reaction column for receiving said trapping agent and said reaction product from said column in response to the reversal of said gas flow, and means for supplying a liquid to said column simultaneously with the gas flow through said column in said reversed direction whereby substantially all of said reaction product is removed from the walls of said column by the scrubbing action of said liquid and gas, so that said reversal of gas flow through said column discharges said liquid and any remaining reaction product into said vial.

13. Apparatus as set forth in claim 12 in which bulbous column means is provided downstream of the reaction column for effecting liquid-gas interaction between gases flowing therein and liquid supplied thereto.

14. Apparatus as set forth in claim 13 in which the bulbous column means provided downstream of the reaction column has an inside bulb diameter of about 0.15 inch and an inside constriction diameter of about 0.11 inch.

15. Apparatus as set forth in claim 1 in which said treating means includes bulbous column means and said liquid is supplied to the bulbous column means whereby liquid-gas interaction takes place between combustion gases flowing through the bulbous column means and the liquid supplied thereto.

16. Apparatus as set forth in claim 15 in which means is provided for supplying two different liquids sequentially to said bulbous column means.

17. Apparatus as set forth in claim 15 in which said bulbous column means includes sequentially connected primary and secondary bulbous columns, and said liquid is introduced in between said columns.

18. Apparatus as set forth in claim 17 in which the primary bulbous column has an inside bulb diameter of about 0.11 inch and an inside constriction diameter of about 0.09 inch, and the secondary bulbous column has an inside bulb diameter of about 0.15 inch and an inside constriction diameter of about 0.11 inch.

19. A method for preparing samples for use in radioactive isotope tracer studies comprising (a) burning a specimen of material containing a radioactive isotope tracer in a combustion chamber to produce combustion products containing the radioactive tracer in the form of condensable vapors, (b) supplying oxygen to the combustion chamber at a controlled rate during the burning of the material, (c) continuously exhausting the combustion products from the combustion chamber during the burning of the material and cooling the exhausted products in a heat exchanger to condense a portion of the vapors therein, (d) separating the condensed vapors from the remaining gaseous combustion products, (e) contacting the remaining gaseous combustion products with liquid in a gas-liquid column to condense substantially all of the remaining condensable vapors therein, (f) terminating the oxygen supply and supplying an inert gas to the combustion chamber upon completion of the burning of the material so as to sweep any residual combustion products out of the chamber and on through the heat exchanger and gas-liquid column to provide substantially complete recovery of the radioactive tracer while purging the system prior to combustion of the next sample, and (g) collecting the condensed vapors from the heat exchanger and from the gas-liquid column in a sample vial and directing the inert gas from the heat exchanger into the vial so that any oxygen contained in the vial headspace may be displaced therefrom.

20. The method of claim 19 in which the liquid used in step (e) is water.

21. The method of claim 19 in which water is injected into the combustion chamber along with the supply of inert gas in step (f).

22. The method of claim 19 in which the gaseous combustion products include $^3H_2O$.

23. The method of claim 19 in which the condensed vapors are collected from the gas-liquid column in step (g) by passing liquid scintillator solution through the column and into the sample vial along with the condensed vapors.

24. The method of claim 23 which includes the additional steps of (h) supplying an inert gas along with liquid water to the gas-liquid column in a direction countercurrent to the flow of combustion products therethrough to thereby flush the colum of other fluids, and (i) directing the fluids, inert gas and liquid water flushed from the gas-liquid column to waste.

25. A method for preparing samples for use in radioactive isotope tracer studies comprising (a) burning a specimen of material containing a radioactive isotope tracer in a combustion chamber to produce gaseous combustion products containing the radioactive tracer, (b) supplying oxygen to the combustion chamber at a controlled rate during the burning of the material, (c) continuously exhausting the combustion products from the combustion chamber during the burning of the material, (c) terminating the oxygen supply and supplying an inert gas to the combustion chamber upon completion of the burning of the material so as to sweep any residual combustion products out of the chamber to provide substantially complete recovery of the radioactive tracer while purging the system prior to combustion of the next sample, (d) contacting the combustion products from the combustion chamber with a liquid suitable for trapping the gaseous radioactive isotope tracer in a reaction column whereby the isotope tracer is reacted with and absorbed by the liquid, (e) passing untrapped combustion gases from the reaction column into a gas-liquid column, and (f) supplying an inert gas along with liquid scintillator solution to the gas-liquid column in a direction countercurrent to the flow of combustion gases therethrough to thereby flush the fluids therein from the gas-liquid column and the reaction column for collection in a sample vial.

26. The method of claim 25 which includes the additional step of (g) terminating the supply of liquid scintillator solution to the gas-liquid column while continuing to supply inert gas thereto in a direction countercurrent to the flow of combustion gases therethrough to thereby flush the gas-liquid column and the reaction column of other fluids, and (h) directing the fluids flushed from the reaction column to waste.

27. The method of claim 25 in which the gaseous combustion products include $^{14}CO_2$.

28. A method for preparing samples for use in radioactive isotope tracer studies comprising (a) burning a specimen of material containing a radioactive isotope tracer in a combustion chamber to produce gaseous combustion products containing at least one radioactive isotope tracer in the form of condensable vapors and at least one other radioactive isotope tracer, (b) supplying oxygen to the combustion chamber at a controlled rate during the burning of the material, (c) continuously exhausting the combustion products from the combustion chamber during the burning of the material and cooling the exhausted products in a heat exchanger to condense a portion of the vapors therein, (d) separating the condensed vapors from the remaining gaseous combustion products, (e) contacting the remaining gaseous combustion products with liquid in first gas-liquid column means to condense substantially all of the remaining condensable vapors therein, (f) contacting the gaseous combustion products from the first gas-liquid column with a liquid suitable for trapping the said other radioactive isotope tracer in a reaction column whereby the isotope tracer is reacted with and absorbed by the liquid, (g) passing untrapped combustion gases from the reaction column into second gas-liquid column means, (h) terminating the oxygen supply and supplying an inert gas to the combustion chamber upon completion of the burning of the material so as to sweep any residual combustion products out of the chamber and on through the heat exchanger, first gas-liquid column means, reaction column and second gas-liquid column means to provide substantially complete recovery of the radioactive isotope tracers while purging the system prior to combustion of the next sample, (i) collecting the condensed vapors from the heat exchanger and from the first gas-liquid column means in a first sample vial and directing the inert gas from the heat exchanger into the vial so that any oxygen contained in the vial headspace may be displaced therefrom, and (j) supplying an inert gas along with liquid scintillator solution second gas-liquid column means in a direction countercurrent to the flow of combustion gases therethrough to thereby flush the fluids therein from the second gas-liquid column means and the reaction column for collection in a second sample vial.

29. The method of claim 28 in which the condensed vapors are collected from the first gas-liquid column means in step (i) by passing liquid scintillator solution through this column means and into the first sample vial along with the condensed vapors.

30. The method of claim 28 which includes the additional steps of (k) supplying an inert gas along with liquid water to the first gas-liquid column means in a direction countercurrent to the flow of combustion products therethrough to thereby flush this column means of other fluids, and (l) directing the fluids, inert gas and liquid water flushed from the first gas-liquid column means to waste.

31. The method of claim 28 which includes the additional steps of (k) terminating the supply of liquid scintillator solution to the second gas-liquid column means while continuing to supply inert gas thereto in a direction countercurrent to the flow of combustion gases therethrough to thereby flush this gas-liquid column means and the reaction column of other fluids, and (l) directing the fluids flushed from the reaction column to waste.

32. The method of claim 28 in which the gaseous combustion products include $^3H_2O$ and $^{14}CO_2$.

* * * * *